United States Patent
Holloway, Jr.

(10) Patent No.: US 6,929,241 B2
(45) Date of Patent: Aug. 16, 2005

(54) HYDRAULIC VALVE AND A LIQUID FLOW SYSTEM

(76) Inventor: Rufus M. Holloway, Jr., 99 W. Columbia St., Orlando, FL (US) 32806

(*) Notice: Subject to any disclaimer, the term of this patent is extended or adjusted under 35 U.S.C. 154(b) by 211 days.

(21) Appl. No.: 10/051,823

(22) Filed: Jan. 17, 2002

(65) Prior Publication Data

US 2002/0096654 A1 Jul. 25, 2002

Related U.S. Application Data

(60) Provisional application No. 60/264,131, filed on Jan. 25, 2001.

(51) Int. Cl.[7] .............................................. F16K 31/04
(52) U.S. Cl. .................. 251/129.11; 251/294; 251/343; 137/625.38
(58) Field of Search ........................... 251/129.11, 294, 251/325, 326, 343, 344, 347; 137/625.33, 625.38; 405/40, 41, 42, 104, 106; 239/453, 456, 460, 504, 505, 506, 541, 542

(56) References Cited

U.S. PATENT DOCUMENTS

| | | | | |
|---|---|---|---|---|
| 392,499 A | * | 11/1888 | Coldwell | ...................... 405/96 |
| 2,699,653 A | * | 1/1955 | Ponsar | ......................... 405/96 |
| 3,025,880 A | * | 3/1962 | Anderson | .............. 137/625.33 |
| 3,159,172 A | * | 12/1964 | Baxter | ...................... 137/236.1 |
| 3,874,596 A | * | 4/1975 | Baxter | ......................... 239/542 |
| 4,783,048 A | * | 11/1988 | St. Clair | ................. 251/129.11 |

* cited by examiner

*Primary Examiner*—Gene Mancene
*Assistant Examiner*—Patrick Buechner
(74) *Attorney, Agent, or Firm*—Transnational Enterprises Inc.

(57) ABSTRACT

This invention relates to a hydraulic valve (10) and an interconnected hydraulic valve system, (10, 12). Two coaxially disposed pipes (14, 20) are positioned vertically to form an annular space (11) there between. A flange (22) provided with a external seal (23) cooperates with an end of the outer pipe (20). Openings (18) formed in the inner pipe (14) regulates water flow. The inner pipe is also sealingly interconnected with a main supply pipe (12) for entry of water through opening (16). An electrical motorized hoist (26) provides for activation and operation of the hydraulic valve system.

13 Claims, 3 Drawing Sheets

HYDRAULIC VALVE AND A LIQUID FLOW SYSTEM

This application claims the benefit of Ser. No. 60/264,131 filed on Jan. 25, 2001.

INTRODUCTION

This invention relates to a hydraulic valve adapted to be in direct connection with a liquid flow supply source so as also to constitute a hydraulic valve system.

It is well known to regulate the flow of liquids to flood plains of irrigation areas by means of hydraulic valves, sluice gates or the like.

One of the problems encountered by such an arrangement is that the hydraulic valves are fairly complex in which the valve is a generally a ferrous metal cast body with a gate having special seals and operated by a spindle drive which is activated by an electric motor and gear arrangement, for local or remote operation depending on the location of the valve.

An object of the present invention is to provide a simple and also inexpensive hydraulic valve with essentially coaxially disposed and spaced apart tubular members.

It is a further object of the present invention to interconnect the valve of the present invention to a supply source, such as a supply pipe, to constitute a hydraulic valve system.

SUMMARY OF THE PRESENT INVENTION

According to the present invention, a hydraulic valve comprising an inner tubular member arranged substantially vertically with respect to an outer tubular member in coaxially and concentric relationship, wherein the inner tubular member is vertically and concentrically disposed to form a defined annular space with respect to the outer tubular member, the inner member is formed with a flange which is adapted to cooperate to form a seal at one of the ends of the outer tubular member, openings are provided on the surface of the inner tubular member for liquid flow, hoisting means connected to the outer tubular member to enable vertical movement between the outer tubular member and the inner tubular member, whereby liquid flow through the opening occurs.

Advantageously, the inner tubular member is in direct liquid flow connection with a supply source, for example, a supply pipe. The inner tubular member is sealingly connected to the supply pipe and disposed substantially vertically with respect to the supply pipe.

Conveniently, the inner tubular member may be of ferrous metal and the outer tubular member that is spaced from the inner tubular member may be also of ferrous metal.

Suitably, the inner tubular member is provided with a flange surface having an external sealing material and so adapted to form a liquid tight joint with an end of the outer tubular member, to provide an inexpensive sealing arrangement. Openings in the inner tubular member regulate the flow of liquid.

The tubular members, specifically the outer tubular member, could be raised or lowered by various means, such as a hoisting gear with rack and pinion electric motor drives, with the assistance of pulleys, cables, counter weights, gearing systems and electric or mechanical drives to lift and displace the outer tubular member, to enable liquid to flow through the openings.

Suitably, the raising or lowering of the water level associated with counterweights and axle and pulley arrangement would displace the outer tubular member depending on the level of water in the inner tubular member. For example, as liquid enters the inner tubular member, the counterweight would raise the outer tubular member and allow water to flow out, and likewise in reverse operation to close the valve arrangement and shut the liquid flow.

DESCRIPTION OF THE INVENTION

The present invention will now be described by way of example, with reference to the accompanying drawings, in which.

The present invention will now be described in detail, only by way of example, and is not restricted to this description.

Figure 1:
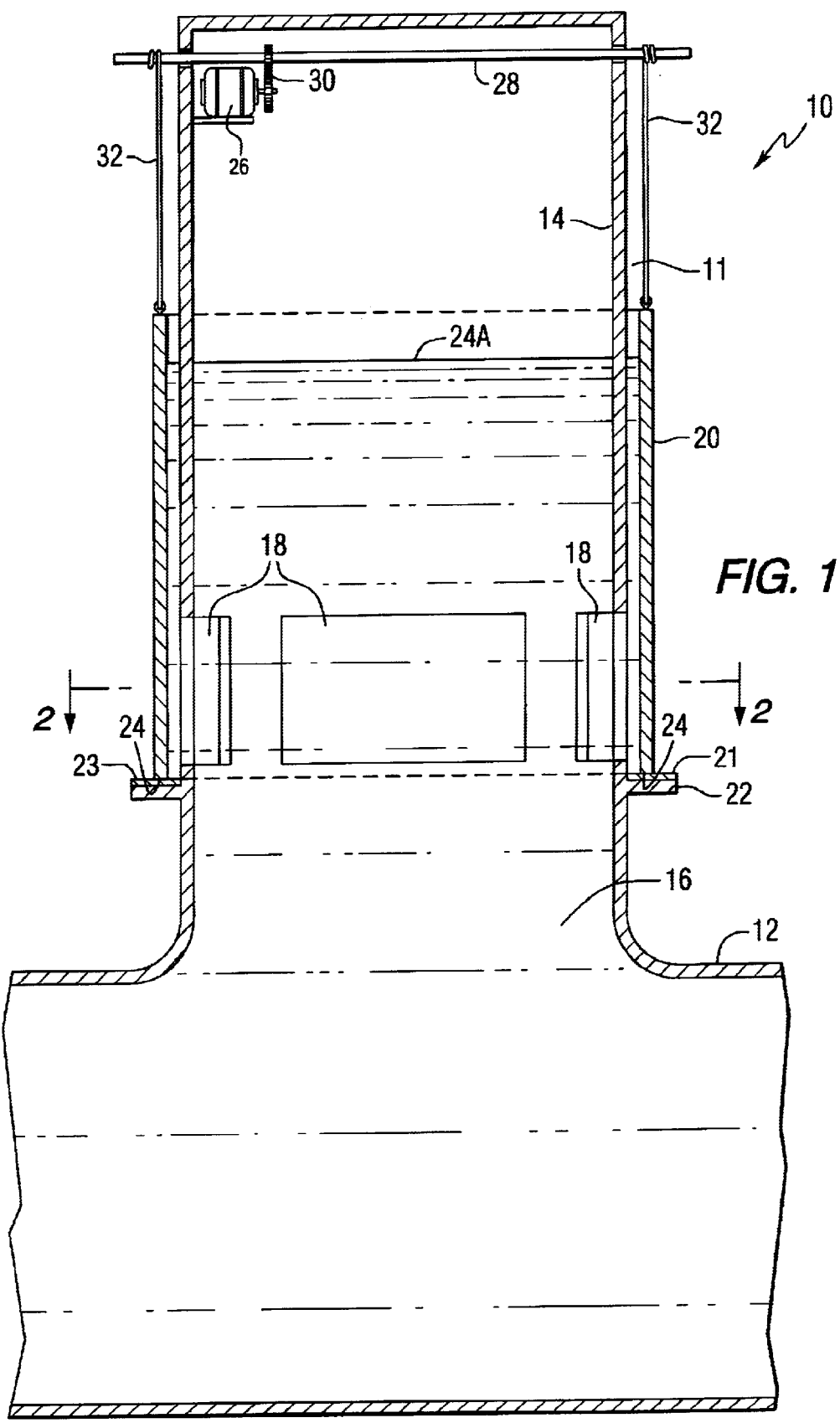
FIG. 1 shows a hydraulic valve system in the closed position according to the present invention.

According to the present invention, FIG. 1 depicts not only the present invention of the hydraulic valve but how it is sealingly interconnected to a supply source of liquid, for example, a supply main pipe (12), by way of liquid flow through entry (16).

The present invention is constituted by a hydraulic valve (10), which is structured by an inner tubular member (14) and positioned substantially vertically with respect to an outer tubular member (20). The inner tubular member and the outer tubular member are positioned in a coaxial and concentric manner to form an annular space (11) there between. One important feature of this invention is that the inner tubular member is formed with a flange (22). The external surface (21) of the flange (22) is adapted to cooperate with one of the ends (24) of the outer tubular member (20). An elastomeric or other type of metal seal may be provided between one of the ends (24) of the outer tubular member and the external surface (21) of the flange. Openings (18) such as holes or windows of any shape or size may be formed at the surface of the inner tubular member. Preferably, square openings (18) are provided In operation, of the valve, the liquid pressure, in this example, water in the main pipe (12) will rise within the inner pipe to a predetermined level 24A corresponding to the pressure of the water in the main pipe (12) for entry through opening (16). A hoisting means (26), which is either an electric motor drive with a gearing arrangement or any gear drive system is provided or with an wire cable (32) to hoist the outer tubular member off the seal (21) formed on the flange(22).

Suitably, the inner and the outer tubular members can be of a ferrous metal, clay, wood or bamboo or any reinforced plastic. The weight of the outer tubular member must be adapted or formed to form a proper seal (21) with the external surface of the flange. If necessary, additional weights (not shown) may be provided to the outer tubular member to create the liquid tight seal.

The tubular members, specifically the outer tubular member, could be raised or lowered by various means, such as a hoisting gear with rack and pinion electric motor drives, with the assistance of pulleys, cables, counter weights and electric or mechanical drives to lift and displace the outer tubular member, to enable liquid to flow through the openings.

Suitably, the raising or lowering of the water level associated with counterweights and axle and pulley arrangement would displace the outer tubular member depending on the level of water in the inner tubular member. For example, as liquid enters the inner tubular member, the counterweight would raise the external tubular member and allow water to flow, and likewise in reverse operation to close the valve arrangement and shut the liquid flow.

In the present invention, by way of example, the inner tubular member formed of plastic, clay, wood, bamboo or of ferrous metal or of plastic, clay, wood or bamboo having a diameter of about 30 inches. The outer tubular member is also formed of a ferrous metal having a diameter of about 36 inches. Openings (18) shown as square shaped windows, although other shapes such as round or oval, may be provided. The position of the flange(22) of the inner tubular member which is the sealing surface between the inner and the outer tubular members is located about 6 inches in height from the main pipe (12). The whole arrangement is substantially vertical in connection with the main pipe (12) disposed on a horizontal surface (not shown) with the entry of liquid through opening (16).

The flange (22) is formed as an integral part of the inner tubular member, but may also be attached separately.

Figure 2:
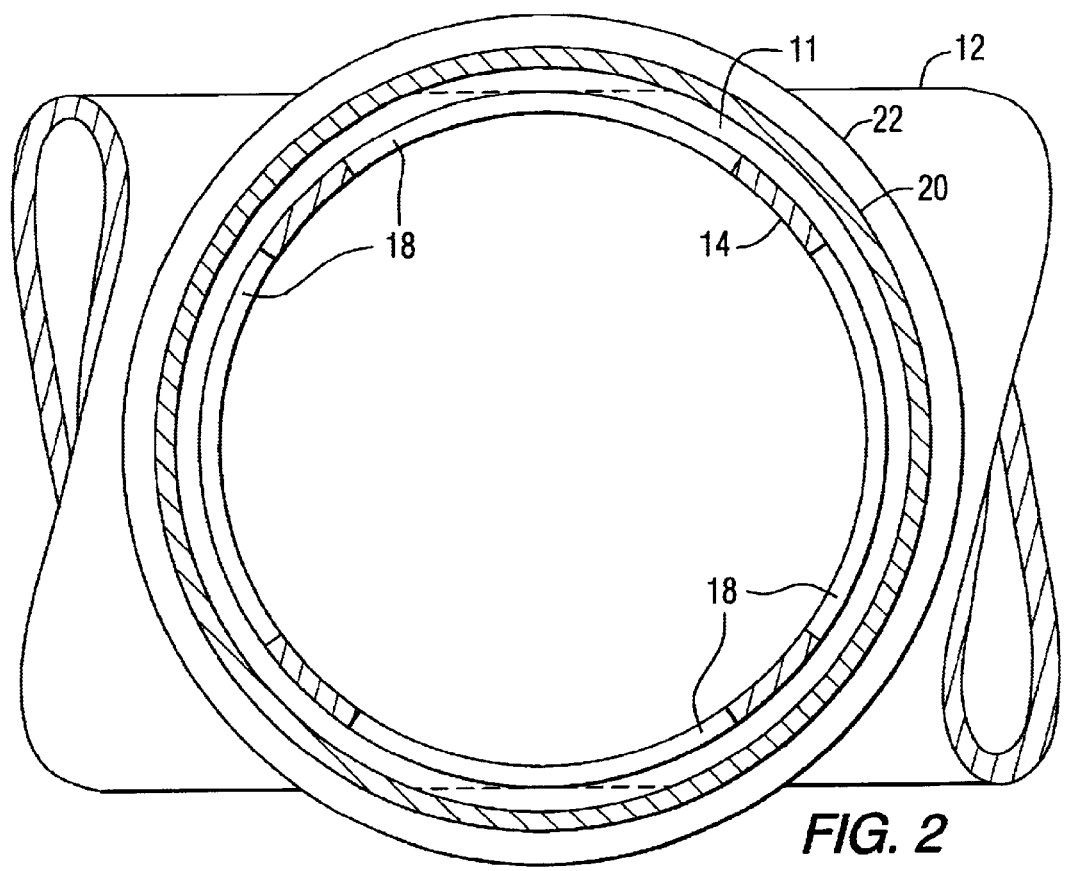
FIG. 2 shows a top view of the tubular arrangements and the flange according to the present invention.
Figure 3:
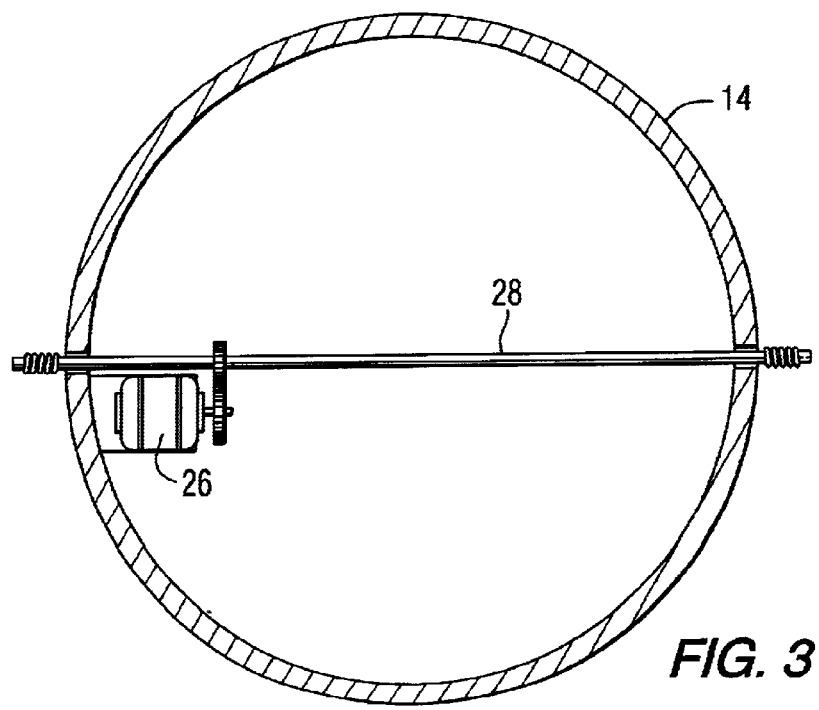
FIG. 3 shows an electric motor drive for hoisting means of the valve system is accordance with the present invention.

FIGS. 2 and 3 depict in top view the concentric disposition of the inner and outer tubular members along with the flange (22) and the hoisting means (26)

Figure 4:
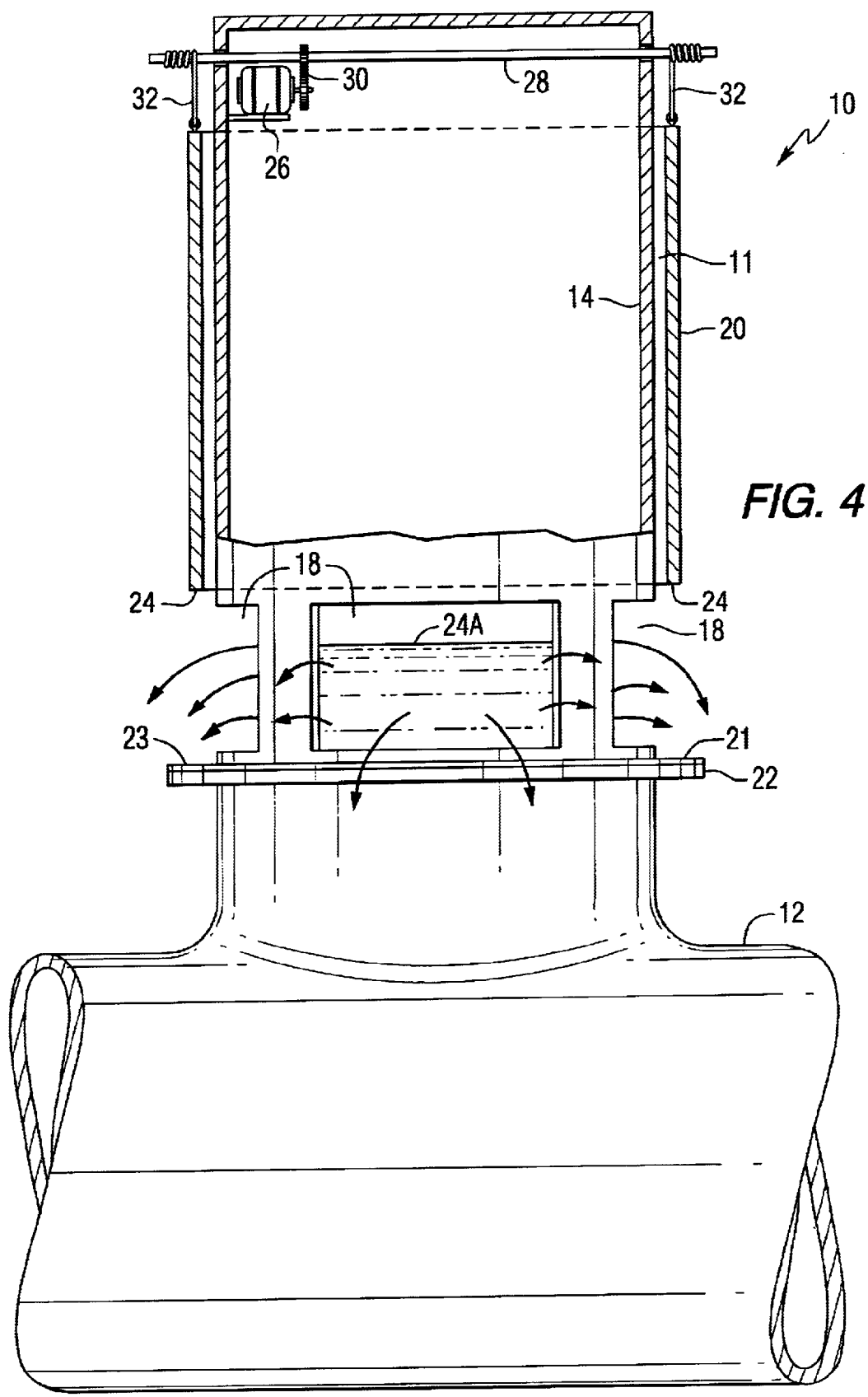
FIG. 4 depicts the valve system in an open position in accordance with the present invention.

FIG. 4 is adapted to show the present invention of the hydraulic valve system in an open position, the arrows indicating the direction of the flow of water from the main pipe (12) and (16) through to the openings (18). The electric motor is interconnected to a rod or pipe (28) by a gear or pulley mechanism. The rod or pipe is located in the inner tubular member and is rotated by the mechanism (30) with wrap cables (32) to hoist the outer tubular member from its seat on the flange (22). It is clearly shown, in operation, that the outer tubular member sealingly rests on the flange of the inner tubular member so that the openings are closed off, so that water or any other liquid is prevented from flowing out through the openings. Advantageously, to effect, water or any other liquid such as liquid fertilizers, organic liquid manure, to flow out of the valve, the outer tubular member as shown in the open position in FIG. 4, is hoisted by a drive, or any pulley or cable lifting system, thus enabling liquid or water to flow out of any of the hydraulic valve system. It should be noted that the present invention utilizes water or other liquids to flow to any predetermined heights as long as it is not higher than the outer tubular member.

What is claimed is:

1. A hydraulic valve (10) comprising an inner tubular member (14) arranged substantially vertically with respect to an outer tubular member (20) in coaxially and concentric relationship, wherein the inner tubular member is vertically and concentrically disposed to form a defined annular space (11) with respect to the outer tubular member, the inner member is formed with a flange (22) which is adapted to cooperate to form a seal (21) at one of the ends (24) of the outer tubular member, openings (18) are provided on the surface of the inner tubular member for liquid flow, hoisting means (26) connected to the outer tubular member to enable vertical movement between the outer tubular member and the inner tubular member, whereby liquid flow through the opening occurs.

2. A valve as claimed in claim 1, wherein one of the ends (24) of the outer tubular member is adapted to seat directly on the sealing surface (21) to form an hydraulic seal.

3. A valve as claimed in claim 2, wherein the seal is formed of elastomeric material.

4. A valve as claimed in claim 2 wherein the seal is formed of a metal sealing material.

5. A valve as claimed in claim 1, wherein the openings (18) may be of any dimension or shape, and are spaced and located above the flange to enable liquid flow.

6. A valve as claimed in claim 1 characterized in that the hoisting means is constituted by drive means formed with an electric motor (26) and a gear mechanism (30) for hoisting the outer tubular member with respect to the inner tubular member to a sufficient height above the openings of inner tubular member, whereby to enable liquid flow.

7. A valve as claimed in claim 1, wherein a rod or pipe (28) is disposed through openings in the inner tubular member with wrap cables (32) around a pipe (28) to hoist the outer tubular member.

8. A valve as claimed in claim 1, wherein the outer tubular member should be constituted in such a manner or material so that the weight of the outer tubular member is of sufficient forces to form the seal (23) in the flange (22), to prevent leakage of liquid.

9. A valve as claimed in claim 1, wherein the inner and outer tubular members may be constituted of metal or plastic material, or metal lined internally with plastic material.

10. A valve as claimed in claim 1, wherein the hoisting means (26) for displacement of the outer tubular member with respect to the inner tubular member, would be constituted in various forms such as a rack and pinion electric motor drive, with the assistance of pulleys, gears, cables, counter weights and physical or manually operated drives to displace the outer tubular member, thereby to enable liquid flow.

11. A valve as claimed in claim 1, wherein the hoisting means (26) linked to the outer tubular member would be with counter weights assisted by raising or lowering the water level in the inner tubular member to displace the outer tubular member from its seat, whereby to enable liquid flow.

12. A hydraulic valve system as claimed in claim 10, wherein the inner tubular member (14) is directly connected to a supply member (12) constituted by a liquid flow pipe (12) through an opening (16).

13. A hydraulic valve system as claimed in claim 12, wherein the inner tubular member (14) may be connected to the supply member (12) by a sealed joint, or connection.

* * * * *